Figure 1:
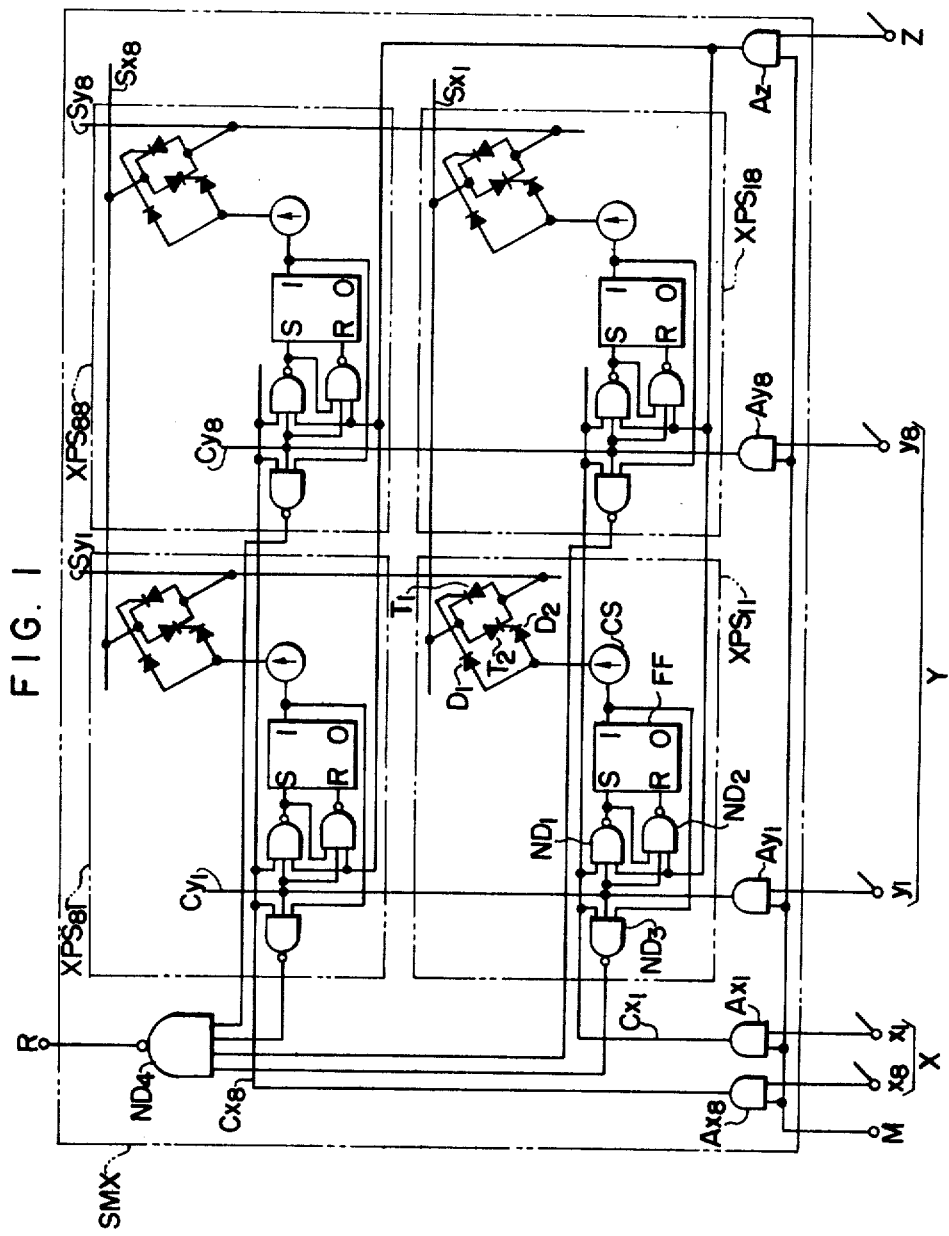

United States Patent [19]

Mukaemachi et al.

[11] 4,024,352
[45] May 17, 1977

[54] CROSS-POINT SWITCH MATRIX AND MULTISWITCHING NETWORK USING THE SAME

[75] Inventors: Takuji Mukaemachi; Tohru Hoshi, both of Yokohama, Japan

[73] Assignee: Hitachi, Ltd., Japan

[22] Filed: Dec. 15, 1975

[21] Appl. No.: 640,701

[30] Foreign Application Priority Data
Dec. 16, 1974 Japan ............................ 49-143416

[52] U.S. Cl. .................... 170/18 GF; 340/166 R
[51] Int. Cl.² ................................. H04Q 3/00
[58] Field of Search ............... 179/18 GF, 18 GE; 340/166 R

[56] References Cited

UNITED STATES PATENTS

| | | | |
|---|---|---|---|
| 3,760,361 | 9/1973 | Leger et al. | 179/18 GF |
| 3,928,730 | 12/1975 | Aagaard et al. | 179/18 GF |

*Primary Examiner*—Thomas A. Robinson
*Attorney, Agent, or Firm*—Craig & Antonelli

[57] ABSTRACT

A plurality of cross-point matrices each having a plurality of holding circuits respectively associated with a corresponding cross point are arranged in multiple stages, which are linked with each other to form a multi-stage switching network. Each switch matrix is provided with an associated NAND gate connected to gates capable of being selectively impressed with the signals representing the state of the holding circuits within the particular switch matrix. The output of the NAND gate is connected to an OR gate for each stage.

11 Claims, 2 Drawing Figures

CROSS-POINT SWITCH MATRIX AND MULTISWITCHING NETWORK USING THE SAME

The present invention relates to the selection and control of a vacant channel in a switching network using semiconductor switching elements.

The conventional switching network as represented by a telephone exchange employs mechanical-contact cross-point switches such as reed relays and cross-bar switches. With the recent marked development of semiconductor technology, however, a semiconductor cross-point switch has begun to be practically used.

The semiconductor cross-point switch may be roughly classified into a PNPN switch system (including PNPN diodes and PNPN transistors) and an FET switch system (including J-FET and MOS FET). Excepting the switch system empolying the PNPN diodes, every type of cross-point switch comprises the above-mentioned PNPN transistor or FET as a cross-point element for connecting or disconnecting a couple of terminals, a holding circuit for storing the information on the connected or disconnected state of the cross-point element, a drive circuit inserted between the output of the holding circuit and the cross-point element for driving the cross-point element in response to the state of the holding circuit, and an input logic circuit connected to the input of the holding circuit. The drive circuit may take any of various forms depending on the construction of the holding circuit and the cross-point element and, if required, may be integral with the holding circuit.

As in the case of a mechanical switch, such cross-point switches may be arranged in $m$ lines and $n$ columns to form an $m \times n$ switch matrix. Further, a plurality of such switch matrices may be combined appropriately to construct a multi-stage switching network in link form.

In order to connect a couple of subscribers by operating such a switching network, it is necessary to select a vacant channel. In the conventional crossbar exchange system, a three-line switch is used, and one of the three lines is designated as a control line (C line), the electric potential of which is checked for selection of a vacant channel. On the other hand, the electronic exchange of storage program type which is now making rapid progress employs what is called a map system in which a vacant channel is selected in accordance with the state of a link memory provided in the central processor.

Of the above-mentioned two methods for introducing semiconductor switches, the former is not economical in that an increased number of elements and pins involved leads to a reduced mounting efficiency for integrated circuitry and the requirement for additional hardware for checking the C line. On the other hand, the latter system, which requires a great number of expensive temporary memories, is also uneconomical for a small-capacity station.

An object of the present invention is to enable economic selection of a vacant channel in the switching network employing semiconductor cross-point switches.

The present invention is characterized in that the state of the holding circuits corresponding to cross-points included in each channel is read and the result of the reading determined, thus selecting a vacant channel.

Figure 2:
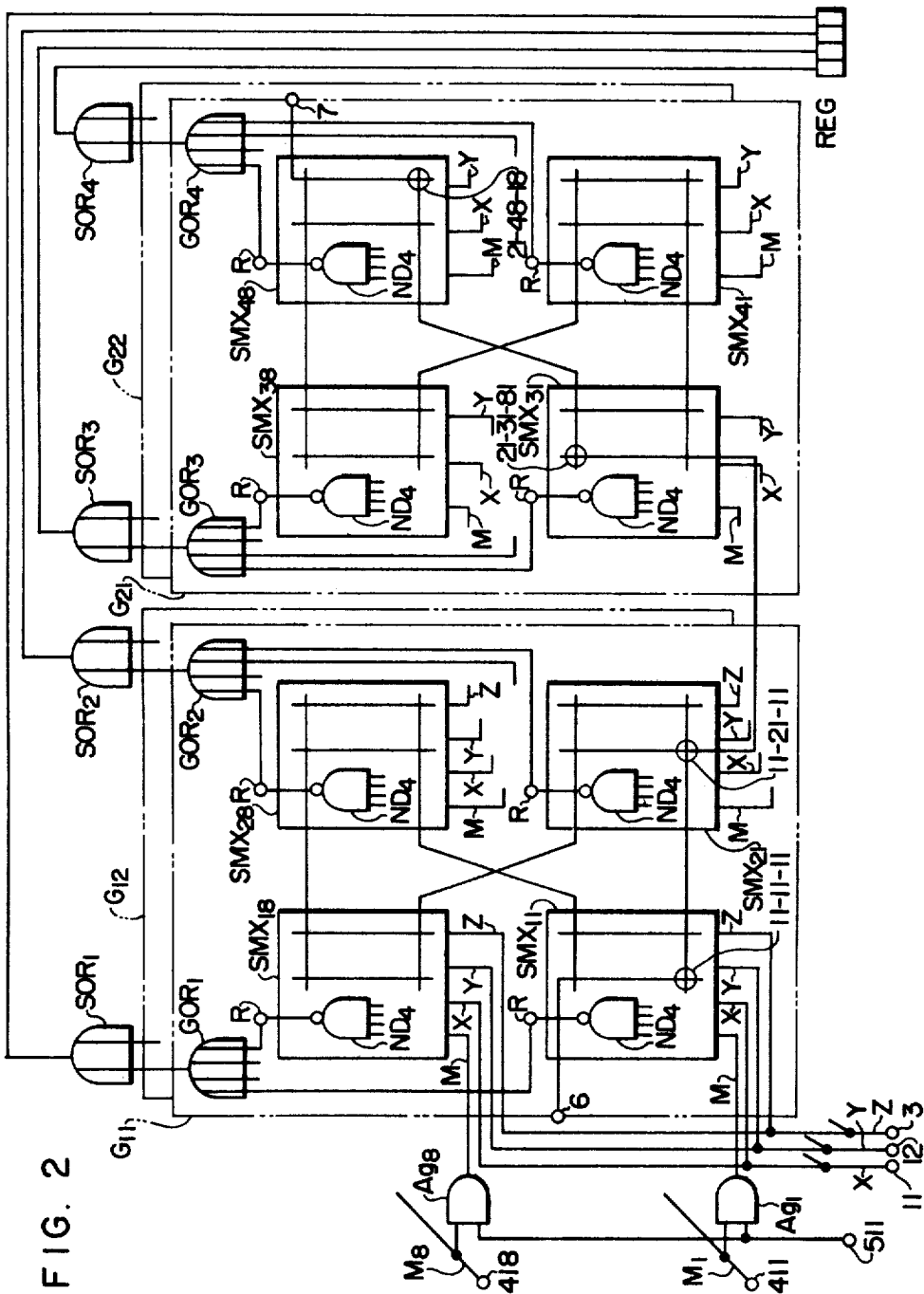

The above and other objects, features and advantages will be made apparent by the detailed description taken in conjunction with the accompanying drawings, in which:

FIG. 1 is a wiring diagram showing an $8 \times 8$ switch matrix having means for detecting the state of the holding circuits according to the present invention; and FIG. 2 is a wiring diagram showing a switching network having means for detecting a vacant channel according to the present invention.

First referring to FIG. 1 showing an $8 \times 8$ switch matrix SMX which provides a basis for the switching network according to the present invention, parts corresponding to only four cross-point switches XPS11, XPS18, XPS81 and XPS88 are shown by way of simplification. Between these cross-point switches, there are actually 60 similar cross points. Explanation below will be made only of the cross-point switch XPS11 of all the cross-point switches which have quite the same construction. In the cross-point switch XPS11, symbols T1 and T2 show PNPN transistors for connecting and disconnecting the row line $Sx1$ and column line $Sy1$. The anode gates of these transistors are connected through the diodes D1 and D2 to the driving circuit CS respectively. The driving circuit CS, which is preferably a constant-voltage source, is connected to the "1" output terminal of the flip-flop FF. The set terminal S and reset terminal R of the flip-flop FF are connected to the outputs of the NAND gates ND1 and ND2 respectively. The "1" output terminal of the flip-flop FF is also connected to another NAND gate ND3. Each of the NAND gates ND1, ND2 and ND3 has three input terminals. Of these NAND gates, the NAND gates ND1 and ND2 are impressed with a Z signal through the AND gate Az. The other two input terminals of the NAND gate ND1 are connected to the row control line $Cx1$ and column control line $Cy1$ respectively, while the other two input terminals of the NAND gate ND2 are connected to the column control line $Cy1$ and the output of the NAND gate ND1. The input terminals of the NAND gate ND3 are connected to the row control line, $Cx1$, the column control line $Cy1$ and the "1" output terminal of the flip-flop FF, respectively. The output of the NAND gate ND3 is applied to a NAND gate ND4 together with the outputs of NAND gates ND3 of other cross-point switches.

The row control lines $Cx1$ to $Cx8$ and the column control lines $Cy1$ to $Cy8$ are connected, through the AND gates $Ax1$ to $Ax8$ and through $Ay1$ to $Ay8$, to the X signals $x1$ to $x8$ and Y signals $y1$ to $y8$, respectively. The remaining input terminal of each of the AND gates $Ax1$ to $Ax8$, $Ay1$ to $Ay8$ and $Az$ is impressed with the M signal.

The operation of this switch matrix will be explained below.

In controlling the switch matrix of FIG. 1, the M signal is set at "1". Further, in opening and closing the cross-point switches of the switch matrix SMX, the Z signal is set at "1", while it is designated as "0" for detection of the state of the flip-flop FF.

First, assume that with the Z signal at "1", the X signal in the form of $x1$ and Y signal in the form of $y1$ are both in the state of "1", namely, that the cross-point switch XPS11 shown in the drawing is selected. The NAND gate ND1 produces a "0" output thereby to set the flip-flop FF. Thereby, the driving circuit CS energizes the diodes D1, D2 and the PNPN transistors T1, T2, thus closing the circuit between the row line Sx1 and the column line Sy1. At the same time, an output signal in the same "1" state as that of the flip-flop FF is produced at the R output terminal of the NAND gate ND4. By checking this signal, a normal operating condition may be verified.

Next, suppose the Z, x1 and y1 signals are "1", "0" and "1" respectively, namely, that another cross-point switch in the same matrix is selected. The NAND gate ND2 produces a "0" output thereby to reset the flip-flop FF, thus cutting off the PNPN transistors T1 and T2 as cross-point elements. In any other x1-y1 combinations with the Z signal at "11", the flip-flop FF of the cross-point switch XPS11 remains unchanged, so that the output at the R terminal is in the state of "0".

In the case where the x1 and y1 signals are both "1" with the Z signal at "0", that is, where the state of the flip-flop FF of the cross-point switch XPS11 is to be detected, the flip-flop FF is inhibited by the Z signal and remains unchanged. Under this condition, the "1" output of the flip-flop FF is applied through the NAND gate ND3 to the NAND gate ND4. As a result "1" and "0" outputs are produced at the R terminal in accordance with the set and reset conditions of the flip-flop FF respectively. In any other combinations of x1 and y1 signals with the Z signal at "0", the flip-flop FF of the cross-point switch XPS11 remains the same and the NAND gate ND3 is kept closed.

In this way, it is possible to determine whether each of the cross-point switches in the switch matrix SMX is vacant or occupied, by checking the R terminal while sequentially designating the switches by X and Y signals with the Z signal fixed to "0". This operation does not affect the flip-flop or lines in operation.

Explanation will be made below of a switching network employing a multiplicity of switch matrices shown in FIG. 1.

An embodiment of the present invention shown in FIG. 2 illustrates a switching network in four stages. Four matrix switch groups SMX11 to SMX18, SMX21 to SMX28, SMX31 to SMX38, and SMX41 to SMX48 each containing 8 matrices are arranged in four stages connected in link. (For avoiding complexity, the drawing shows each switch matrix as containing only those parts corresponding to Sx and Sy lines and NAND gate ND4 of FIG. 1.) The switch matrices SMX11 to SMX18 and SMX21 to SMX28 make up a first link grid G11, while the switch matrices SMX31 to SMX38 and SMX41 to SMX48 constitute a second link grid G21. An actual switching network, as shown in the drawing under consideration, is composed of a plurality of the first link grids G11, G12, . . . and a plurality of the second link grids G21, G22, . . . .

The outputs of NAND gates ND4 provided for respective switch matrices are connected to the inputs of the OR gates GOR1 to GOR4 respectively associated with the respective stages and link grids G11, G12, . . . and G21, G22, . . . . The outputs of the OR gates GOR1 to GOR4, in turn, are connected to the inputs of the OR gates SOR1 to SOR4 provided for respective stages.

The outputs of the four OR gates SOR1 to SOR4 are connected to corresponding bit positions of the register REG.

Next, the wiring of the signal lines M, X, Y and Z of the switch matrix will be explained. Although the detailed wiring is shown in the drawing only for the first-stage switch matrices SMX11 to SMX18 of the link grid G11, similar wiring is provided for the remaining stages and link grids the illustration of which is omitted for simplicity's sake. The X and Y signals of the switch matrices SMX11 to SMX18 are respectively commonly connected, and they are further connected commonly with the X and Y signal lines of the first-stage switch matrices of the other link grids G22, . . . at the X signal terminal 11 and the Y signal terminal 12, respectively. Also, the M signal lines of the switch matrices SMX11 to SMX18 are connected to the output terminals of the AND gates Ag1 to Ag8, to which the M signals M1 to M8 respectively are applied as one input thereto and the selection signal G11 for the grid G11 as the other input. Further, the Z lines of the switch matrices SMX11 to SMX18 of all the other switch matrices are connected to a common Z signal terminal 3.

In the above circuit arrangement, a determination signal is applied to each signal terminal and, as explained with reference to FIG. 1, a given cross point in a given switch matrix is designated, thus setting or resetting the holding circuit (flip-flop) of the particular cross point. At the same time, such a condition can be read. In the case where the cross point 11-11-11 enclosed in a circle in the switch matrix SMX11 is to be controlled, for example, the M signal terminal 411 and G signal terminal 511 are set at "1", the terminals x1 and y1 (See FIG. 1) of the X and Y signal terminals 11 and 12 being also set at "1". If this cross point 11-11-11 is to be closed, namely, if the holding circuit is to be set, the Z signal terminal is set at "1"; while if the state of the holding circuit associated with the cross point 11-11-11 is to be read, the Z signal is set at "0", thus making possible the operation explained with reference to FIG. 1. As will be obvious, with the Z signal set at "1", a "1" signal appears at the R output terminal of the NAND gate ND4 of the switch matrix SMX11; while with the Z signal set at "0", signals in the states of "1" and "0" are produced at the R terminal depending on the set or reset conditions of the holding circuit respectively. In other words, a set of signals M, G, X and Y makes up a piece of address information designating a corresponding cross point; while the Z signal constitutes another piece of information contributing to the selection of the operation of controlling or reading the state of the holding circuit associated with the designated cross point. It will be easy to understand that the same can be said of the operation of the switch matrices other than SMX11 in the same stage, the switch matrices SMX21 to SMX28 in the other stages and link grids.

As an example, explanation will be made of the case in which a channel usable for connection between the input terminal 6 and the output terminal 7 is searched. While maintaining the Z signal at "0", a cross-point switch in each stage is designated by the use of M, G, X and Y signals for selection of a channel between the input terminal 6 and the output terminal 7. In this connection, assume that cross-point switches 11-11-11, 11-21-11, 21-31-81 and 21-48-18 have been designated as shown. The outputs R of the NAND gates ND4 of the switch matrices SMX11, SMX21, SMX31 and SMX48 assume the state of "1" or "0" depending on the states of the holding circuits associated with the respective cross-point switches. The "0" state of the R output indicates that the designated particular cross-point is vacant and the "1" signal that it is busy. The outputs R of the NAND gates ND4 of the switch matrices SMX11, SMX21, SMX31 and SMX48 are applied, through the OR gates GOR1, GOR2, GOR3 and GOR4, through the SOR1, SOR2, SOR3 and SOR4, to the corresponding bit positions of the register REG respectively. As a result, in the event that all the 4 bits of the register REG are in the state of "0", it shows that a channel between the input terminal 6 and the output terminal 7 containing the designated 4 cross points 11-11-11, 11-21-11, 21-31-81 and 21-48-18 is vacant. If even a bit of the register REG is "1", by contrast, that the particular channel is not usable is indicated. In the latter case, another set of signals G, M, X and Y is given which may represent another channel that may be able to successfully connect the input terminal 6 and the output terminal 7. Similar processes are repeated for any number of channels until a channel is found whereby the connection between the input terminal 6 and the output terminal 7 is capable of being established.

When a vacant channel is found for connection between the input terminal 6 and output terminal 7, then the Z signal is set at "1", so that the signal set of G, M, X and Y associated with the particular vacant channel is applied to a corresponding switch matrix of each stage, thereby setting the holding circuits of the related cross points. As explained with reference to FIG. 1, the holding circuit or flip-flop FF for each cross point, when newly set, causes a "1" signal to be produced at the output R of the NAND gate ND4 of the switch matrix associated with the particular cross point. This serves to confirm the successful establishment of the connection by the designated channel in response to the "1" state of all the 4 bits of the register REG.

It should be noted that the operations of vacant channel selection and the connection are substantially the same, the only difference being the fact that the Z signal information is set at "1" or "0".

The access time from the delivery of address information on cross points until the receipt of vacant channel information of the result of channel-searching operation is determined by the types of the OR gates of the cross points. If TTL or CMOS is used for such elements, the access time of about several microseconds or several tens of microseconds is easily achieved.

As will be seen from the foregoing description, the present invention permits the information on the holding circuits of the cross-point switches to be utilized for vacant channel section by addition of only a small amount of hardware.

Such an addition includes, in the abovementioned embodiment, one NAND gate (ND3) for vacant channel selection for each cross point and one NAND gate (ND4) for each switch matrix. In view of the small space required for these additional logic circuits, the resulting cost increase is negligible in circuit integration of the whole switch. Also, the terminal addition for each switch matrix is the two terminals of Z and R, which little affects the integrating efficiency in packaging.

Further, in view of the fact that detection is made directly from the holding circuits of the cross-point switches, the trouble of contradiction between memory and actual state of switching network which sometimes occurs in the map system is hardly encountered. Furthermore, a very high speed detection is possible without affecting the paths busy with speech. As a further advantage, the invention may be used for checking the connecting operation for an improved reliability of connection, rendering the general operation of the switching network both reliable and economical.

What is claimed is:

1. A cross-point switch matrix comprising a plurality of holding circuits respectively associated with a plurality of cross points, a plurality of cross-point elements opened or closed in response to the state of said holding circuits respectively, control means for selectively setting or resetting said holding circuits respectively, read means for selectively reading the state of said holding circuits respectively, first logic OR means impressed with the outputs from all said read means in said switch matrix, and operation selector means for selectively causing said control means or said read means to operate.

2. A switch matrix according to claim 1, in which each of said holding circuits is a flip-flop having set and reset inputs and "1" and "0" outputs.

3. A switch matrix according to claim 1, in which each of said cross-point switches is a PNPN transistor.

4. A switch matrix according to claim 1, in which said control means for each of said holding circuits includes a couple of NAND gates.

5. A switch matrix according to claim 1, in which each of said read means includes a NAND gate.

6. A switch matrix according to claim 1, in which said first logic OR means comprises a NAND gate.

7. A multi-stage switching network, wherein multiple stages of switch matrices as in claim 1 are linked with each other, and the output of said first logic OR means of each switch matrix is applied to the input of second logic OR means in each of said stages.

8. A multi-stage switching network according to claim 7, in which said second logic OR means comprises an OR gate.

9. In a cross-point switch matrix for selectively interconnecting rows and columns of a matrix of lines having a plurality of cross-point switches associated with the respective rows and columns of said matrix of lines for interconnecting the respective rows and columns in response to control signals applied thereto,
the improvement wherein each of said cross-point switches comprises:
a cross-point switching element connected between a row and a column of said matrix and having a control input,
a memory circuit, having an output coupled to the control input of said cross-point switching element, for storing a signal representative of the open or closed state of said cross-point switching element and supplying said signal to the control input of said cross-point switching element, whereby said cross-point switching element is opened or closed in dependence upon the signal stored in said memory circuit, and
means, coupled to said memory circuit, for addressing said memory circuit and reading out therefrom the state of said cross-point switching element in accordance with the signal stored in said memory circuit in response to a first address signal, and for addressing said memory circuit and supplying thereto said signal representative of the open or closed state of said cross-point switching element in response to a second address signal.

10. The improvement according to claim 9, wherein said matrix further comprises a logic OR circuit coupled to the reading out means of each of said cross-point switches.

11. The improvement according to claim 9, wherein said memory circuit comprises a flip-flop and said means comprises means responsive to signals identifying the matrix address of the row and column with which said cross-point switch is associated, and being responsive to said first address signal representative of a first binary level for reading out the set or reset state of said flip-flop without affecting the state thereof, and being responsive to said second address signal representative of a second binary level for affecting the set or reset state of said flip-flop and thereby establishing the open or closed state of said cross-point switching element.

* * * * *